United States Patent [19]

Tamura et al.

[11] Patent Number: 5,069,721

[45] Date of Patent: Dec. 3, 1991

[54] MORTAR CONCRETE COMPOSITION

[75] Inventors: Akira Tamura; Naotaka Watanabe, both of Tokyo; Hitoshi Fujiyoshi; Masako Shirota, both of Yokohama, all of Japan

[73] Assignee: Mitsui-Cyanamid, Ltd., Tokyo, Japan

[21] Appl. No.: 497,254

[22] Filed: Mar. 22, 1990

[30] Foreign Application Priority Data

Apr. 13, 1989 [JP] Japan .................................. 1-91882

[51] Int. Cl.$^5$ .................. C04B 7/02; C04B 24/14; C04B 24/10; C08K 3/26
[52] U.S. Cl. .................................. 106/724; 106/713; 106/725; 106/727; 524/5; 524/8; 524/425
[58] Field of Search ............... 106/606, 608, 610, 713, 106/724, 725, 727; 524/2, 5, 6, 8, 423, 425

[56] References Cited

U.S. PATENT DOCUMENTS

| | | | |
|---|---|---|---|
| 4,479,826 | 10/1984 | Papalos et al. | 106/90 |
| 4,759,802 | 7/1988 | Ochi et al. | 106/314 |
| 4,818,288 | 4/1989 | Aignesberger et al. | 106/90 |
| 4,960,465 | 10/1990 | Arfaei | 106/724 |
| 4,963,190 | 10/1990 | Mizunuma et al. | 106/724 |

FOREIGN PATENT DOCUMENTS 52-104549 9/1977 Japan .
56-26252 6/1981 Japan .

Primary Examiner—William R. Dixon, Jr.
Assistant Examiner—M. Marcheschi
Attorney, Agent, or Firm—Wenderoth, Lind & Ponack

[57] ABSTRACT

Disclosed is a mortar.concrete composition comprising a polymer emulsion, a portland cement material and an aggregate, which is characterized in that the polymer emulsion is one prepared by neutralizing a seed polymer with an acid or a salt or by quaternizing it with a quaternizing agent, the surfaces of the emulsion grains being thereby highly densely cationated, where the seed polymer is formed by adding a monomer as represented by the following formula (I) or a mixture of the monomer (I) and copolymerizable ethylenic unsaturated monomer(s) to a seed latex of a carboxyl-modified synthetic rubber latex or synthetic resin emulsion and polymerizing them:

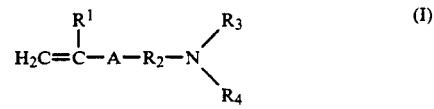

The polymer of the invention may noticeably reinforce the strength of the shaped product even when the amount of the polymer added is small. The polymer dispersion of the invention can be applied to not only the conventional ordinary materials but also concrete construction materials, although the application to the latter has heretofore been considered economically impossible.

5 Claims, No Drawings

MORTAR CONCRETE COMPOSITION

FIELD OF THE INVENTION

The present invention relates to a composition comprising a synthetic rubber latex or synthetic resin emulsion, a cement material and an aggregate, which is utilized in various fields of not only ordinary mortars and concretes but also reparing and reinforcing mortars and concretes, tiles, repairing materials for exteriors of buildings, adhesive-reinforcing materials, floor materials, water-proofing materials, shotting and coating materials, joint materials, surface filling materials, etc.

BACKGROUND OF THE INVENTION

Hitherto, various synthetic rubber latexes and synthetic resin emulsions have been utilized as an improving agent for cement mortars or concretes in the form of a cement-blending polymer dispersion. In general, a nonionic surfactant-containing anionic synthetic rubber latex or a synthetic resin emulsion as dispersed and stabilized in the presence of a nonionic surfactant is employed for the purpose. However, since the surfaces of cement and sand grains are negatively charged (minus-charged) in the presence of water, the rubber latex or resin emulsion is limitative in the functions such as adhesion power under the aqueous condition. Accordingly, development of a cationic polymer dispersion has been desired in this technical field.

As the cationic polymer dispersion, cationic latexes disclosed in Japanese Patent Application Laid-Open No. 52-104549 and Japanese Patent Publication No. 56-26252 have already been put to practical use.

It has been known that the cationic latex is superior to any other anionic or nonionic latex as a cement-blending polymer dispersion, because the former has better water-retentiveness and dispersion stability in blending and also has a higher adhesion strength than the latter.

However, the cationic polymer dispersion which is now commercially sold is one prepared by a method of adding a large amount of an anionic surfactant or a nonionic surfactant to an anionic latex followed by cation-modifying the resulting blend with an alkylamine or aminosilane compound or by a method of adding a large amount of a cationic or amphoteric surfactant to an anionic latex.

The commercial cationic polymer dispersion often have various problems that the quality lowers during storage for a long period of time so that it could no more be cationic and that it could not sufficiently display the functions if the operation order of handling the dispersion is incorrect. In particular, the strength, adhesiveness and durability of the dispersion are noticeably influenced by the ambient condition. Under the above situation, the effect of the conventional or commercial cationic polymer dispersions has heretofore been often considered problematic.

SUMMARY OF THE INVENTION

As opposed to this, the polymer emulsion to be employed in the present invention is cationic on the surfaces of the emulsion grains and therefore it is free from deterioration of the quality and lowering of the strength and it can display and maintain a sufficient effect for a long period of time. In addition, it can well be blended with a cement material and sand. Accordingly, the polymer emulsion of the present invention may be blended with a cement or mortar material to give a polymer cement mortar or concrete having fully improved physical properties, whereupon the polymer/cement ratio may well be small. The object of the present invention is to therefore provide such polymer cement mortar and concrete having fully improved physical properties.

This invention is as follows:

1. A mortar.concrete composition comprising a polymer emulsion, a portland cement material and an aggregate, which is characterized in that the polymer emulsion is one prepared by neutralizing a seed polymer with an acid or a salt or by quaternizing it with a quaternizing agent, the surfaces of the emulsion grains being thereby highly densely cationated, where the seed polymer is formed by adding a monomer as represented by the following formula (I) or a mixture of the monomer (I) and copolymerizable ethylenic unsaturated monomer(s) to a seed latex of a carboxyl-modified synthetic rubber latex or synthetic resin emulsion and polymerizing them:

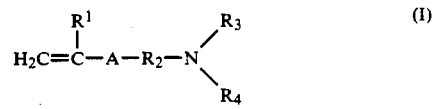

in which
$R_1$ represents H or $CH_3$;
$R_2$ represents an alkylene group having from 2 to 5 carbon atoms;
$R_3$ and $R_4$ each represent H or an alkyl group having from 1 to 5 carbon atoms;
A represents

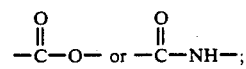

and
$R_1$, $R_3$ and $R_4$ are so selected that the monomer is hardly soluble or insoluble in water.

2. The mortar.concrete composition comprising a polymer emulsion, a portland cement material and an aggregate as claimed in claim 1, in which the amount of the monomer of the formula (I) corresponds to the colloid-equivalent value (absolute value) of the carboxyl-modified latex or more.

3. A repairing or reinforcing mortar.concrete composition, as prepared by adding glass fibers, steel fibers, stainless steel fibers, carbon fibers, vinylon or the like high polymer fibers or a fine powder of ferrosilicon to the blend of the raw materials when the polymer emulsion as claimed in claim 1 is blended with the cement material and aggregate.

4. A light-weight or foamed mortar concrete composition, as prepared by adding a light-weight mineral aggregate such as glass, Shirasu or the like to the blend of the raw materials when the polymer latex as claimed in claim 1 is blended with the cement material and aggregate.

DETAILED EXPLANATION OF THE INVENTION

As the synthetic rubber latex or synthetic reisn emulsion for use in the present invention, anyone known in the technical field can be employed. However, as nonionic substances are hardly stable and cationic substances are few, anionic substances are generally preferably employed.

As examples of the synthetic rubber latex usable in the present invention, there are mentioned carboxyl-modified latexes of styrene-butadiene rubber (SBR), methyl methacrylate-butadiene rubber (MBR), acrylonitrile-butadiene rubber (NBR) or a rubber comprising the said rubber and other monomer component(s) (α), as well as chloroprene rubber (CR) or isoprene rubber (IR). As examples of the synthetic resin emulsion also usable in the present invention, there are mentioned carboxyl-modified emulsions of polymers or copolymers of acrylates, vinyl acetate, vinyl chloride or styrenes, as well as ethylene-vinyl acetate copolymers or ethylene-vinyl chloride copolymers.

The particular monomers for use in the present invention include the monomers represented by the general formula (I) and ethylenic unsaturated monomers which are copolymerizable with the monomers (I).

As examples of the monomers of the formula (I), there are mentioned diehtylaminoethyl acrylate, diethylaminoethyl methacrylate, dipropylaminoethyl acrylate, dipropylaminoethyl methacrylate, dibutylaminoethyl methacrylate, t-butylaminoethyl (meth)acrylate, diethylaminopropyl-methacrylamide, dipropylaminopropylmethacrylamide, dipropylaminopropyl-acrylamide, dibutylaminopropylmethacrylamide and dibutylaminopropyl-acrylamide.

Other ethylenic unsaturated monomers which are copolymerizable with the monomers (I) include, for example, hydrophobic monomers such as acrylates, methacrylates, acrylonitriles, styrenes or vinyl acetate, as well as crosslinking monomers such as N,N'-methylenebisacrylamide, diallyl phthalate, divinylbenzene and (poly)ethylene glycol di (meth)acrylates.

The amounts of the above-mentioned raw materials to be employed in accordance with the present invention are as mentioned below.

The proportion of the monomer of the formula (I) to the seed latex is approximately from 5 to 50% by weight, preferably from 10 to 30% by weight.

In general, ordinary carboxyl-modified latexes have a colloid-equivalent value of from -0.2 to -0.1 meq/g. Accordingly, if the proportion of the monomer of the formula (I) to be employed in the present invention is less than 5% by weight, a stable cationic latex could not be obtained as the amount of the cationic groups is too small. On the contrary, however, if it is more than 50% by weight, the cationic groups would be economically disadvantageously excessive.

The amount of the monomer to be used in the invention can be determined in accordance with the glass transition point or other physical properties of the intended latex. In general, it may be from 0 to about 40% by weight to the monomer (I). The polymerization is effected by seed polymerization, where the pH value of the polymerization system is made to be 6 or more, after the seed latex is diluted or is not diluted with water, and the above-mentioned monomers are added to the system and stirred at a temperature of 20° to 80° C. in the presence of a radical polymerization initiator for seed-polymerization.

If the pH value of the polymerization system is less than 6, the system would gel when the monomers are added thereto or when the monomers are polymerized and, as a result, a stable emulsion could not be obtained. Although the polymerization temperature is not specifically defined under normal pressure, it falls practically within the range of from 20° to 80° C., preferably from 30° to 60° C.

In the polymerization step, an additional surfactant would not be specifically necessary but may be added to the polymerization system if the content is insufficient.

The radical polymerization initiator for use in the present invention may be anyone employable in conventional emulsion polymerization.

For instance, there are mentioned inorganic peroxides such as ammonium persulfate, potassium persulfate or hydrogen peroxide; aliphatic azo compounds such as azobisisobutyronitrile, 2,2'-azobis(2,4-dimethylvaleronitrile), 2,2'-azobis(2-amidinopropane)hydrochloride or azobis(N,N'-dimethyleneisobutylamidine)hydrochloride; benzoyl peroxide; hydroperoxides such as t-butylhydroperoxide, diisopropylbenzene-hydroperoxide or cumene-hydroperoxide; and redoxes comprising a combination of the above-mentioned peroxide and a reducing agent such as ascorbic acids, polyvalent metal salts, acidic sodium sulfite or sodium formaldehyde-sulfoxylate.

The amount of the polymerization initiator to be used in the polymerization process is approximately from 1.0 to 5.0% by weight to the monomers. The polymerization may be conducted by either a batch-wise system or a continuous system.

Next, the resulting polymer is neutralized with an acid or a salt or is quaternary-ammoniated with an ordinary quaternating agent, whereby a cationic polymer emulsion where the cationic groups are distributed highly densely on the surfaces of the latex grains is obtained.

For cationation, an acid, salt or quaternizing agent is added to the seed polymer in an amount equivalent to the monomer (I), with stirring at room temperature, whereupon neutralization finishes instantly and quaternization finishes generally in approximately from 5 to 30 minutes.

The acid employable for the process includes inorganic acids such as hydrochloric acid or sulfuric acid and organic acids such as acetic acid, adipic acid, citric acid or formic acid; the salt includes acidic salts such as sodium hydrogensulfate or sodium dihydrogenphosphate; and the quaternizing agent includes alkyl halides such as methyl chloride, ethyl chloride, methyl bromide or methyl iodide and other ordinary alkylating agents such as dimethyl sulfate or diehtyl sulfate.

In accordance with the present invention, the seed polymer obtained by the seed polymerization may be shaped, for example, into a film or the like, and then cationated by the same procedure as that mentioned above.

Next, incorporation of the polymer emulsion into the cement material and aggregate will be explained hereunder.

Portland cements which are employed in the present invention include ordinary portland cement, white cement, rapid-hardening cement, ultra-rapid-hardening cement and analogues thereof such as slaked lime or gypsum.

The amount of the polymer emulsion to be incorporated into the cement material may fall within the range of approximately from 2 to 120% by weight, as the solid content of the polymer, on the basis of the weight of the portland cement, but is preferably effectively from 2 to 20% by weight or so.

The aggregate to be employed in the invention includes, for example, sand, small gravel, stones or silica sand; glass, vinylone, steel, stainless steel, carbon or the like various fibers; ferrosilicon or the like various fine grains; as well as glass, Shirasu or the like various mineral light-weight aggregates.

The amount of the aggregate to be blended is to be adjusted in accordance with the means of blending the respective components and the object to which the resulting blend is to be applied. In general, the weight of the aggregate is from 0 to 5 times of the weight of the cement material, and blending may be effected by a conventional means.

For instance, the polymer emulsion, cement material and aggregate are blended and kneaded together with water by a conventional method.

EXAMPLE 1

701.3 g of a carboxyl-modified SBR latex (pH 8.3; solid content 48%; anion colloid-equivalent value $-0.18$ meq/g), 0.4 g of N,N'-methylenebisacrylamide and 159.7 g of water were put in a flask equipped with a stirrer. With fully stirring, 37.5 g of diethylaminoethyl methacrylate (cation colloid-equivalent value of 0.51 meq/g, as quaternated dimethyl sulfate) was dropwise added thereto through a dropping funnel and thereafter the content in the flask was allowed to stand as it was for one hour with blowing $N_2$ gas thereinto. Afterwards, 80 g of 1% aqueous potassium persulfate solution was added to the reaction mixture, which was then heated up to 50° C. for polymerization. Cationic polymer emulsion of 40% solid and 0.32 meq/g cation colloid equivalent is obtained.

A commercial silicon emulsion defoaming agent was added to the thus prepared cation-modified polymer emulsion in an amount of 0.4% as the effective solid content to the total solid content of the emulsion.

(2) An ordinary portland cement was used as the cement component; and Toyoura standard sand was sued as the aggregate.

(3) Blending was effected in accordance with JIS A 1171 (which indicates the way of preparing a polymer cement mortar in a laboratory), whereupon the proportion of cement/sand was ½ and the proportion of water/cement was so adjusted that the flow could be 170 plus/minus 5 mm. The amount of the cation-modified polymer emulsion (obtained in (1)) added was so determined that the polymer/cement ratio could be from 2 to 15%.

(4) The resulting blend was shaped into a determined form with a determined size for the respective tests. All the shaped samples were then cured for 2 days in a wet air, 5 days in water and 21 days in a dry air. The thus prepared and cured samples were used in the following tests.

(5) Bending strength and compression strength of the samples were measured in accordance with JIS A 1172 (which indicates a method of testing the strength of a polymer cement mortar). Shear strength was measured in accordance with the Standard Draft of JCI (Japan Concrete Instutute). Direct tensile strength was measured in accordance with ASTM C 190; and adhesion strength was measured in accordacne with the Standard Draft of JCI (which indicates a method of testing the shear adhesion strength of a polymer cement mortar).

Water absorption was measured in accordance with JIS A 1404 (which indicates a method of testing a cement water-proofing agent for construction).

COMPARATIVE EXAMPLE 1

The same process as in Example 1 was repeated, except that a commercial anionic SBR latex (total solid content: 45%) was employed as the cement-blending polymer dispersion in the step (1) in an amount of from 5 to 20% as the polymer/cement ratio.

COMPARATIVE EXAMPLE 2

The same process as in Example 1 was repeated, except that a commercial cationic SBR latex (total solid content: 30%) was employed in the cement-blending polymer dispersion in the step (1) in an amount of from 5 to 15% as the polymer/cement ratio.

TABLE 1

| Mortar | Polymer Cement Ratio (%) | Water Cement Ratio | Strength (kgf/cm$^2$) | | | | | Water Absorption (%) |
|---|---|---|---|---|---|---|---|---|
| | | | Compression | Bending | Tensile | Shear | Adhesion | |
| Ordinary Portland Cement | 0 | 0.519 | 427 | 52.7 | 32.8 | 84.9 | 2.6 | 7.46 |
| Example 1 | 2 | 0.463 | 440 | 101 | 51.5 | 90.2 | 21.3 | 2.72 |
| | 5 | 0.423 | 489 | 120 | 58.4 | 94.7 | 27.2 | 2.30 |
| | 10 | 0.379 | 530 | 126 | 72.4≦ | 108 | 56.3 | 0.60 |
| | 15 | 0.356 | 489 | 133 | 77.5≦ | 108 | 58.5 | 0.41 |
| Comparative Example 1 | 5 | 0.412 | 481 | 72.8 | 49.8 | 89.8 | 25.9 | 2.81 |
| | 10 | 0.371 | 485 | 106 | | | | |
| | 15 | 0.323 | 499 | 128 | 60.0 | 105 | 29.5 | 0.57 |
| Comparative Example 2 | 5 | 0.411 | 370 | 103 | 45.5 | 79.7 | 23.7 | 2.09 |
| | 10 | 0.374 | 334 | 106 | | | | |
| | 15 | 0.350 | 336 | 93.4 | 50.7 | 75.4 | 33.2 | 0.44 |

Hitherto, it has been known that addition of a cement-blending polymer dispersion to a cement mortar material is effective for improving the physical properties of the resulting mortar concrete, especially for reinforcing the bending strength and tensile strength thereof. It has also known that a cationic polymer dispersion is excellent for the purpose because of the high adhesion power thereof. However, in order to attain the intended effect, the known polymer dispersion is required to be added in an amount of 10% or more as the polymer/cement ratio. Addition of such polymer dispersion is restricted only to limited reparing mortars or adhering mortars as well as to limited polymer cement mortars usable as cement pastes. Under the above situation, a high-performace cationic polymer dispersion has been desired, which has excellent adhesiveness and high strength. Additionally, a high-performance polymer dispersion has also been desired, which can be applied to ordinary concretes or polymer concretes.

Table 1 indicates the water/cement ratio, the water absorption and the strength of the shaped product, in relation to the polymer/cement ratio (%) of the polymer cement mortar as prepared in each of Example 1 and Comparative Examples 1 to 2.

As compared with the commercial polymer dispersions, the polymer dispersion of the present invention is excellent with respect to not only the adhesion power of the polymer itself but also the strength of the shaped product containing the polymer. The polymer of the invention may noticeably reinforce the strength of the shaped product even when the amount of the polymer added is small. The polymer dispersion of the invention can be applied to not only the conventional ordinary materials but also concrete construction materials, although the application to the latter has heretofore been considered economically impossible. Accordingly, the industrial advantage of the present invention is great.

What is claimed is:

1. A repairing or reinforcing mortar.concrete composition, which is prepared by adding glass fibers, steel fibers, stainless steel fibers, carbon fibers, or high polymer fibers or a fine powder of ferrosilicon to a blend of raw materials for a mortar.concrete composition comprising about 2 to 120 parts by weight of a polymer emulsion, 100 parts by weight of a portland cement material and about 0 to 500 parts by weight of an aggregate, wherein the polymer emulsion is prepared by neutralizing a seed polymer with an acid or a salt or by quaternizing it with a quaternizing agent, the surfaces of the emulsion grains being thereby highly densely cationated, where the seed polymer is formed by adding a monomer as represented by the following formula (I) or a mixture of the monomer (I) and copolymerizable ethylenic unsaturated monomer(s) to a seed latex of a carboxyl-modified synthetic rubber latex or synthetic resin emulsion and polymerizing them:

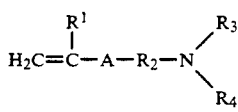

in which
   $R_1$ represents H or $CH_3$;
   $R_2$ represents an alkylene group having from 2 to 5 carbon atoms;
   $R_3$ and $R_4$ each represent H or an alkyl group having from 1 to 5 carbon atoms;
   A represents

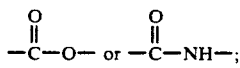

and
   $R_1$, $R_3$ and $R_4$ are so selected that the monomer is hardly soluble or insoluble in water,
when the polymer emulsion is blended with the cement material and aggregate.

2. A light-weight or foamed mortar.concrete composition, which is prepared by adding a light-weight mineral aggregate to a blend of the raw material for a mortar.concrete composition comprising about 2 to 120 parts by weight of a polymer emulsion, 100 parts by weight of a portland cement material and about 0 to 500 parts by weight of an aggregate, wherein the polymer emulsion is prepared by neutralizing a seed polymer with an acid or a salt or by quaternizing it with a quaternizing agent, the surfaces of the emulsion grains being thereby highly densely cationated, where the seed polymer is formed by adding a monomer as represented by the following formula (I) or a mixture of the monomer (I) and copolymerizable ethylenic unsaturated monomer(s) to a seed latex of a carboxyl-modified synthetic rubber latex or synthetic resin emulsion and polymerizing them:

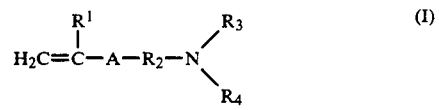

in which
   $R_1$ represents H or $CH_3$;
   $R_2$ represents an alkylene group having from 2 to 5 carbon atoms;
   $R_3$ and $R_4$ each represent H or an alkyl group having from 1 to 5 carbon atoms;
   A represents

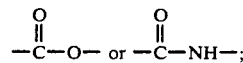

and
   $R_1$, $R_3$ and $R_4$ are so selected that the monomer is hardly soluble or insoluble in water,
when the polymer latex is blended with the cement material and aggregate.

3. A mortar.concrete composition comprising about 2 to 120 parts by weight of a polymer emulsion, 100 parts by weight of a portland cement material and about 0 to 500 parts by weight of an aggregate, wherein the polymer emulsion is prepared by neutralizing a seed polymer with an acid or a salt or by quaternizing it with a quaternizing agent, the surfaces of the emulsion grains being thereby highly densely cationated, where the seed polymer is formed by adding a monomer as represented by the following formula (I) or a mixture of the monomer (I) and copolymerizable ethylenic unsaturated monomer(s) to a seed latex of a carboxyl-modified synthetic rubber latex or synthetic resin emulsion and polymerizing them:

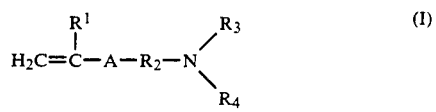

in which
   $R_1$ represents H or $CH_3$;
   $R_2$ represents an alkylene group having from 2 to 5 carbon atoms;
   $R_3$ and $R_4$ each represent H or an alkyl group having from 1 to 5 carbon atoms;
   A represents

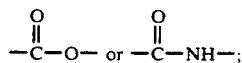

and
   $R_1$, $R_3$ and $R_4$ are so selected that the monomer is hardly soluble or insoluble in water.

4. The repairing or reinforcing mortar.concrete composition of claim 1 wherein the fibers are vinylon fibers.

5. The light-weight or foamed mortar.concrete composition of claim 1 wherein the mineral aggregate is glass or Shirasu.

* * * * *